United States Patent [19]

Emery

[11] Patent Number: 5,558,455
[45] Date of Patent: Sep. 24, 1996

[54] BREAK-AWAY BANNER ROD FITTER

[75] Inventor: Nelson J. Emery, Emporia, Kans.

[73] Assignee: Emery Fixtures Inc., Emporia, Kans.

[21] Appl. No.: 453,341

[22] Filed: May 30, 1995

[51] Int. Cl.$^6$ ...................................................... F16D 9/06
[52] U.S. Cl. ................... 403/2; 403/11; 403/24; 248/548; 116/173
[58] Field of Search ............... 403/2, 24, 11–12, 403/116; 248/548, 900; 52/98, 27; 40/218; 116/173, 174, 175

[56] References Cited

U.S. PATENT DOCUMENTS

| | | |
|---|---|---|
| 208,326 | 9/1878 | Miner . |
| 1,086,346 | 2/1914 | Barrick . |
| 3,321,160 | 5/1967 | Turnbull . |
| 3,325,950 | 6/1967 | Pfaff, Jr. . |
| 3,349,531 | 10/1967 | Watson ................................ 52/98 X |
| 3,369,331 | 2/1968 | Deskey et al. . |
| 3,551,012 | 12/1970 | Sutliff et al. . |
| 3,912,405 | 10/1975 | Katt .................................... 403/2 |
| 3,936,206 | 2/1976 | Mesiberger . |
| 4,070,837 | 1/1978 | Sato . |
| 4,095,381 | 6/1978 | Garchinsky . |
| 4,279,107 | 7/1981 | Bollmann . |
| 4,330,926 | 5/1982 | McCall ............................... 403/2 X |
| 4,720,204 | 1/1988 | Johnson . |
| 4,785,593 | 11/1988 | Munoz, Jr. . |
| 4,852,847 | 8/1989 | Pagel ................................. 248/548 |
| 5,004,366 | 4/1991 | Simmons ............................ 403/2 |
| 5,157,882 | 10/1992 | Soble ............................. 403/116 X |
| 5,160,111 | 11/1992 | Hugron ................................ 52/98 X |
| 5,320,322 | 6/1994 | Williams ........................ 116/173 X |
| 5,466,082 | 11/1995 | Sherar ................................ 403/2 |

OTHER PUBLICATIONS

Windspill™ Banner Mounting System specification; Street Scenes Banner Company, Apr. 1, 1993.

Primary Examiner—Kenneth J. Dorner
Assistant Examiner—Harry C. Kim
Attorney, Agent, or Firm—Hovey, Williams, Timmons & Collins

[57] ABSTRACT

Any improved break-away banner rod assembly (10) is provided which includes a fixture (12) adapted for coupling to an upright support surface (14) and having a laterally extending, slotted body (30), and a coupler (16) supported by the fixture (12) with a zone of weakness (42) therein. An elongated banner rod (18) is connected with coupler (16) and extends through the slot (34) of body (30). The body (30) captively retains the inner end (44) of rod (18) in the event of load-induced fracture of the coupler (16) at zone (42), and prevents significant downward movement of the rod (18). Preferably, the slot (34) permits movement of rod (18) through a restricted arc upon fracture of the coupler (16).

9 Claims, 2 Drawing Sheets

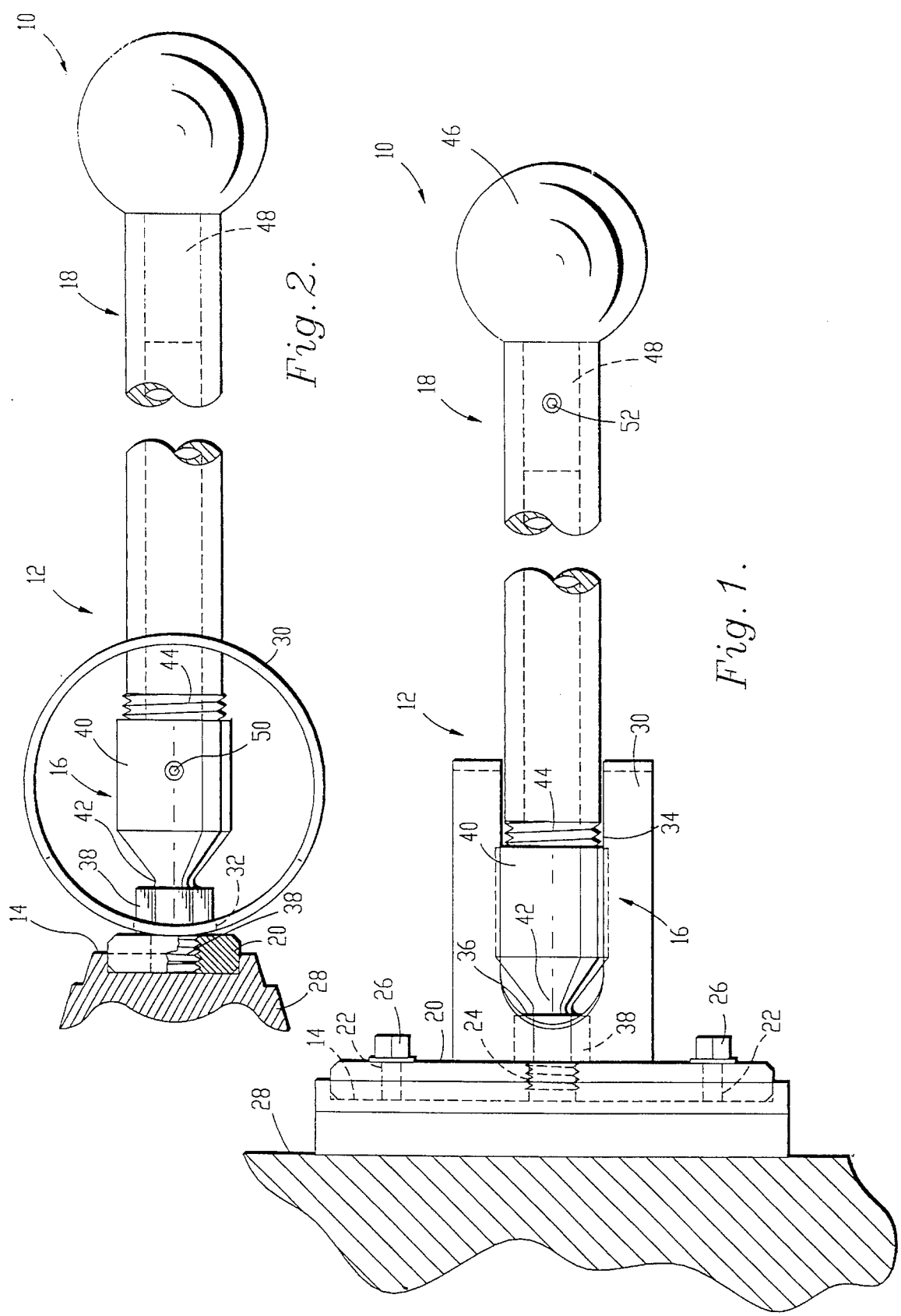

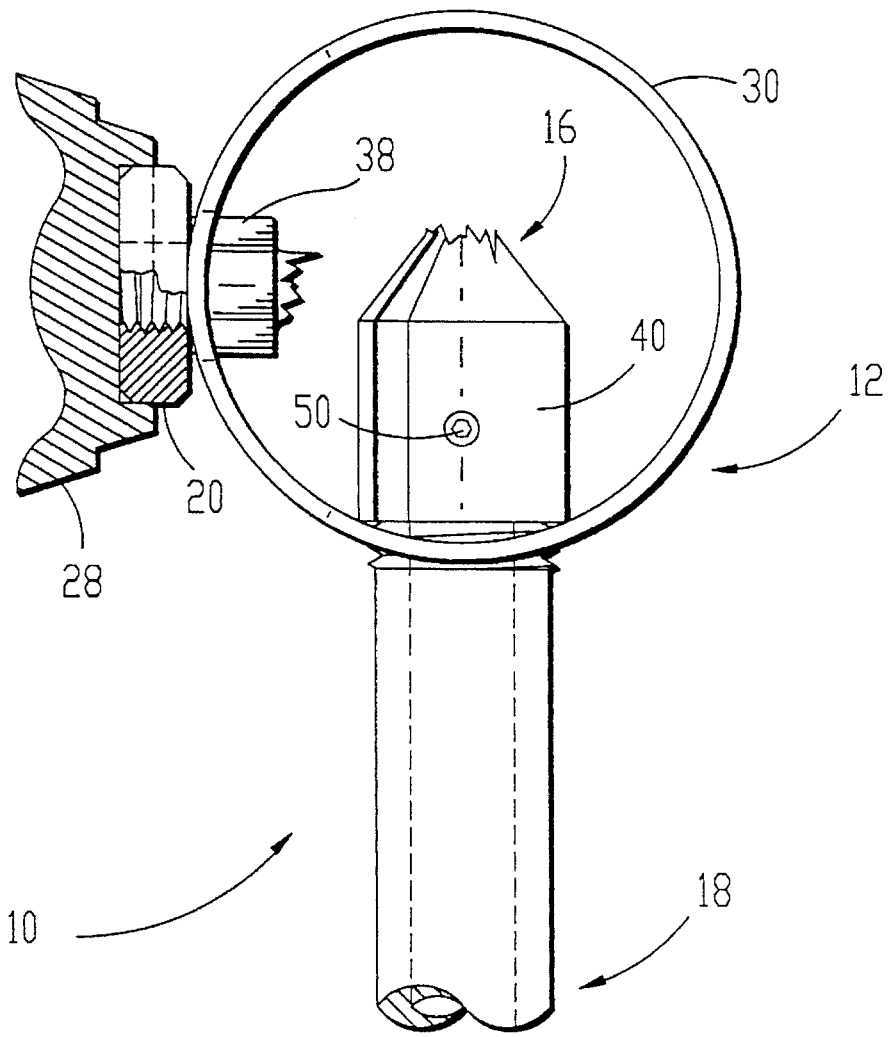
Fig.3.
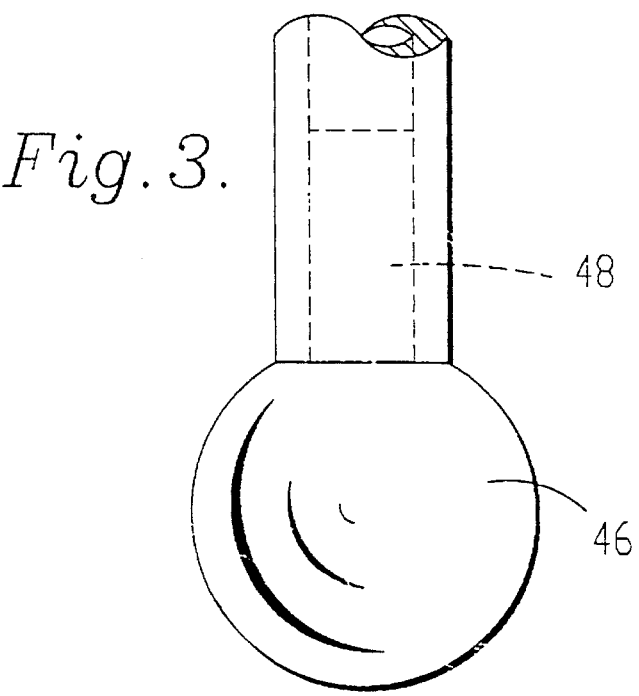

BREAK-AWAY BANNER ROD FITTER

BACKGROUND OF THE INVENTION

1. Field of the Invention

The present invention is broadly concerned with an improved break-away banner rod assembly used for supporting elongated, laterally extending banner rods supported on upright poles or wall surfaces. More particularly, the invention pertains to such a break-away assembly which includes structure for captively retaining the inner end of the banner rod in the event that the rod experiences horizontal or sideways loads sufficient to break the rod-connecting coupler forming a part of the assembly; in this manner, the banner rod is prevented from swinging downwardly and damaging the supporting pole or building surface.

2. Description of the Prior Art

Banners are commonly used by municipalities or businesses in shopping areas in order to advertise the areas, attract shoppers, or simply for aesthetic decoration. In order to support such banners, it is common to provide support assemblies which can be permanently affixed to an upright support surface, such as a light pole or building wall.

As can be appreciated, such banners and their supporting assemblies can be subjected to intense lateral loading during high wind conditions. As a consequence, it is known to provide banner supports with a break-away capacity and safety structure for preventing the projecting banner rods from falling to the earth. For example. U.S. Pat. No. 4,720, 204 describes a break-away banner support which includes a frangible break-away section and a flexible safety line which prevents the banner rod from falling to the earth when the rod support fails. However, this construction is deficient in that the banner rod falls under the influence of gravity and may repeatedly strike the support pole or wall surface with considerable force, abrading or otherwise causing damage to the pole or wall surface.

Accordingly, there is a need in the art for an improved break-away banner support assembly which will fail at a predetermined maximum wind loading experienced by the assembly, but which is restrained against significant, gravity-induced downward movement of the banner rod, thus preventing attendant damage to the adjacent support pole or wall surface.

SUMMARY OF THE INVENTION

The present invention overcomes the problems outlined above and provides an improved break-away banner rod assembly which prevents significant gravity-induced downward movement of a banner rod upon failure; to this end, the assembly of the invention is provided with means captively retaining the inner end of a banner rod in the event of failure, while preferably permitting restricted lateral movement of the banner rod through an arc of desired magnitude.

In more detail, the preferred break-away banner rod of the invention includes a banner rod coupler presenting an inner end adapted to be fixedly supported adjacent an upright support surface, and an opposed, outer, banner rod-receiving end. The coupler includes a frangible zone of weakness between the ends thereof which is adapted to break under excess loading. An elongated banner rod is also provided having one end thereof operatively coupled with the outer end of the coupler and extending generally laterally from the upright support surface. Means is provided for captively retaining the one inner end of the banner rod in the event of load-induced breakage of the coupler.

Advantageously, the retaining means is in the form of a fixture including a laterally extending, apertured member, preferably a tubular body having the sidewall thereof slotted. The sidewall slot presents a pair of opposed ends each spaced from the upright support surface, with the slot extending through an arc of from about 90°–300°, most preferably about 240°.

Use of the banner rod assemblies of the invention permits support of banners or the like while assuring that under extreme wind loads, the assemblies fail prior to failure of the main support pole. At the same time, the retaining structure prevents free fall of the banner rods which could present an extreme safety hazard. Moreover, the rods are prevented from significant downward movement, and thus cannot damage the support pole.

BRIEF DESCRIPTION OF THE DRAWINGS

FIG. 1 is a fragmentary side view of a break-away banner rod assembly in accordance with the invention;

FIG. 2 is a fragmentary plan view of the assembly illustrated in FIG. 1; and

FIG. 3 is a view similar to that of FIG. 2, but depicting the operation of the assembly in the event of load-induced breakage thereof.

DETAILED DESCRIPTION OF THE PREFERRED EMBODIMENTS

Turning now to the drawings, and particularly FIGS. 1–2, it will be seen that a banner rod assembly 10 in accordance with the invention broadly includes a fixture 12 adapted for coupling to an upright support surface 14, a breakable banner rod coupler 16 supported by the fixture 12, and an elongated banner rod 18 having the inner end thereof operably connected with coupler 16 for supporting a depending banner.

In more detail, the fixture 12 includes an apertured metallic support plate 20 designed for fixed attachment to the surface 14. To this end, the plate 20 includes a pair of vertically spaced openings 22 therethrough, as well as a central, threaded bore 24. As illustrated, bolts 26 are employed for fixedly attaching the plate 20 to the support surface, the latter being a part of an upright utility pole 28 or a building wall surface.

The fixture 12 further includes a laterally extending, tubular body 30 which is secured by welding or other means to the face of plate 20 remote from surface 14. The body 30 is provided with a circular opening 32 adjacent plate 20, allowing access to threaded bore 24. In addition, the sidewall of body 30 has an elongated slot 34 therethrough, terminating in rounded ends 36. In the form shown, the slot 34 extends through an arc of approximately 240°, with the ends 36 equally spaced from plate 20 and support surface 14.

The coupler 16 is in the form of a metallic member having an inner end in the form of threaded stud 38, an outer tubular socket end 40 and an area or zone of weakness 42 between the ends 38, 40. As best seen in FIG. 2, it will be seen that the projecting threaded end of stud 38 passes through opening 32 and is threaded into bore 24, thus fixedly securing the inner end of the coupler 16. The outer end 40 of the coupler 16 is internally threaded and receives the corresponding threaded inner end of banner rod 18. Referring to FIG. 1, it will be observed that the end 40 of coupler 16 has a maximum cross-sectional dimension (i.e., outer diameter) which is greater than the opening presented by slot 34. However, banner rod 18 may pass through slot 34.

The banner rod 18 is in the form of a tubular metallic rod and as indicated previously has an externally threaded inner end 44 which is received within end 40 of coupler 16. The opposed, outer end of the rod 18 is adapted to receive and support an enlarged ball end fixture 46. The latter includes a projecting stud 48 which is received within the outer end of rod 18 as illustrated. Respective set screws 50 and 52 are provided for releasably retaining the threaded inner end 44 of banner rod 18 within coupler end 40, and for retaining stud 48 within the outer end of the banner rod.

The zone of weakness 42 provided between inner stud 38 and outer end 40 is an area of reduced thickness which is designed to fracture under the influence of excess loading experienced by the assembly 10 and/or the banner supported thereby. Of course, this zone 42 fractures prior to any loading which would compromise pole 28 or any other support surface to which the assembly 10 is attached.

Referring to FIG. 3, it will be observed that when such a load-induced breakage occurs, rod 18 may pivot in a generally horizontal plane throughout the arc defined by slot 34. In this way, the rod 18 is prevented from striking an adjacent structure or the like. At the same time, fixture 12 prevents the rod from any significant downward movement, and so also prevents damage to pole 28 or any other support surface for the assembly 10. Thus, the assembly 10 can accommodate excess wind loading by appropriate fracturing, while still captively retaining the inner end of banner rod 18 and preventing movement of the banner rod in a fashion which would otherwise cause damage.

In the use of rod assembly 10, the fixture 12 is first affixed to support surface 14, typically through the use of bolts 26. At this point, the rod coupler 16 may be threaded into threaded bore 24. Next, the banner rod 18 is passed through slot 34 and threaded into tubular socket end 40. This completes the banner rod construction, and permits it to operate in the fashion described above.

I claim:

1. A break-away banner rod assembly comprising:
    a fixture comprising a mounting plate adapted for engaging and coupling to an upright support surface and including a laterally extending, tubular body having a slot in the sidewall thereof;
    a banner rod coupler supported by said fixture and including a laterally extending segment having a zone of weakness; and
    an elongated banner rod having one end thereof operatively coupled with said coupler and extending through said slot of said tubular body for supporting a banner therefrom,
    said tubular body captively retaining said one end of said banner rod in the event of load-induced breakage of said coupler adjacent said zone of weakness.

2. The assembly of claim 1, wherein said slot has a pair of opposed ends, each of said ends being spaced from said mounting plate, said slot extending through an arc of from about 90°–300°.

3. The assembly of claim 1, wherein said coupler comprising a threaded stud adapted for threadable insertion within a complemental threaded opening in said mounting plate, a tubular receptacle configured for receiving said one end of said banner rod, said zone of weakness comprising structure defining an area of reduced thickness at the juncture between said stud and receptacle.

4. The assembly of claim 3, wherein said receptacle being internally threaded, and said one end of said banner rod being complementally threaded.

5. The assembly of claim 1, wherein said coupler having a maximum cross-sectional dimension preventing passage of the coupler and said one end of said banner rod out of said slot of said tubular body in the event of said load-induced breakage.

6. A break-away banner rod assembly comprising:
    a banner rod coupler having an inner end adapted to be supported adjacent an upright support surface, and an opposed, outer, banner rod-receiving end;
    an elongated banner rod having one end thereof operatively coupled with said outer end of said coupler, said banner rod extending generally laterally from said coupler; and
    means for captively retaining said one end of said banner rod in the event of load-induced breakage of said coupler,
    said retaining means comprising a tubular body including a sidewall, said sidewall having a slot therein, said banner rod extending through said slot, said coupler being configured to prevent passage of said one end of said banner rod through said slot in the event of said breakage.

7. A break-away banner rod assembly comprising:
    a fixture comprising a mounting plate adapted for coupling to an upright support surface and including a laterally extending, apertured member;
    a banner rod coupler supported by said fixture and including a laterally extending segment having a zone of weakness; and
    an elongated banner rod having one end thereof operatively coupled with said coupler and extending through said member aperture for supporting a banner therefrom,
    said member captively retaining said one end of said banner rod in the event of load-induced breakage of said coupler adjacent said zone of weakness,
    said coupler comprising a threaded stud adapted for threadable insertion within a complemental threaded opening in said mounting plate, a tubular receptacle configured for receiving said one end of said banner rod, said zone of weakness comprising structure defining an area of reduced thickness at the juncture between said stud and receptacle.

8. A break-away banner rod assembly comprising:
    a fixture comprising a mounting plate adapted for engaging and coupling to an upright support surface and including a laterally extending hollow body having a sidewall and an elongated slot through said sidewall;
    a banner rod coupler supported by said fixture and including a laterally extending segment presenting a zone of weakness; and
    an elongated banner rod having one end thereof operatively coupled with said coupler and extending through said slot of said hollow body for supporting a banner therefrom,
    said hollow body captively retaining said one end of said banner rod in the event of load-induced breakage of said coupler adjacent said zone of weakness.

9. A break-away banner rod assembly comprising:
    a banner rod coupler having an inner end adapted to be supported adjacent an upright support surface, and an opposed, outer, banner rod-receiving end;
    an elongated banner rod having a sidewall and one end thereof operatively coupled with said outer end of said coupler, said banner rod extending generally laterally from said coupler; and
    means for captively retaining said one end of said banner rod in the event of load-induced breakage of said coupler, and for preventing significant gravity-induced downward movement of said banner rod, said means for captively retaining said one end of said banner rod comprising structure for engaging the sidewall of said banner rod in order to prevent passage of said banner rod from the structure.

* * * * *